(12) United States Patent
Boxsell

(10) Patent No.: US 6,336,292 B1
(45) Date of Patent: Jan. 8, 2002

(54) HYDROPONIC APPARATUS USING ELLIPTICAL CONDUIT

(76) Inventor: Desmond James Boxsell, 301 Leacroft Street, Burbank, Queensland 4156 (AU)

( * ) Notice: Subject to any disclaimer, the term of this patent is extended or adjusted under 35 U.S.C. 154(b) by 0 days.

(21) Appl. No.: 09/196,638

(22) Filed: Nov. 19, 1998

Related U.S. Application Data

(63) Continuation of application No. PCT/AU97/00321, filed on May 20, 1997.

(51) Int. Cl.[7] .............................................. A01G 31/00
(52) U.S. Cl. ....................................................... 47/62 C
(58) Field of Search .......................... 47/59, 62, 62 C, 47/62 N, 62 B, 64, 65.8

(56) References Cited

U.S. PATENT DOCUMENTS

| 3,872,621 | A | | 3/1975 | Greenbaum | |
| D247,357 | S | * | 2/1978 | Gray | D11/156 |
| 4,118,891 | A | * | 10/1978 | Kehl et al. | 47/59 |
| 4,211,034 | A | * | 7/1980 | Piesner | 47/62 |
| 4,860,490 | A | * | 8/1989 | Morris et al. | 47/63 |
| 5,557,884 | A | * | 9/1996 | Deppe | 47/62 |
| 5,558,461 | A | * | 9/1996 | Van Dorp | 405/43 |

FOREIGN PATENT DOCUMENTS

| IT | WO86/00494 | * | 1/1986 | 47/62 C |

* cited by examiner

Primary Examiner—Charles T. Jordan
Assistant Examiner—Francis T. Palo
(74) Attorney, Agent, or Firm—Hoffman Wasson & Gitler

(57) ABSTRACT

Hydroponic apparatus comprising an elongate hollow conduit (2) of substantially elliptical cross section having inlet (8) for introducing a nutrient solution into the conduit, outlet (10) for allowing nutrient solution to exit the conduit and at least one opening (4) formed in the conduit through which a seedling (18) may extend, at least some of the seedling's roots being retained within the conduit. The elliptical shape of the conduit provides enhanced plant growth by allowing better lateral growth of the root ball and increased contact of the root ball with the nutrient.

4 Claims, 2 Drawing Sheets

HYDROPONIC APPARATUS USING ELLIPTICAL CONDUIT

This application is a continuation of PCT International Application No. PCT/AU97/00321, filed May 20, 1997, claiming priority of Australian Patent Application No. PN9950, filed May 20, 1996, the contents of which are incorporated in their entireties into the present application.

This invention relates to a hydroponic apparatus.

This invention has particular but not exclusive application to a hydroponic apparatus, and for illustrative purposes reference will be made to such application.

Hydroponics involves growing plants in the absence of soil, the necessary nutrients being delivered to the plants in the form of a nutrient solution in water, which passes over the roots of the plant. Hydroponic techniques have certain advantages over more conventional agriculture, which include the ability to carefully control optimum feeding, the elimination of weeds and it allows an improved control of pests and diseases. However, there is a high capital cost compared to traditional methods of agriculture. For this reason, hydroponic cultivation has to be carried out relatively intensively and efficiently if it is to be commercially viable.

One hydroponic method is where the roots of the plants are contained in gullies or conduits which are irrigated, generally continuously, with a nutrient solution.

Many designs for efficient, long lasting and easily installed gully or conduit systems have been trialed. Various rigid and semi-rigid gullies and conduits are known. For example, there are rigid plastic extruded conduits of rectangular or circular cross-section.

However, a number of disadvantages are evident with the existing rigid-type conduits. For example, with flat-based conduits, the nutrient flow is not always concentrated through the roots. Rather the flow of nutrients can pass either side of the roots, thus depriving the roots of maximum exposure to the nutrients. Furthermore, the flat top of such conduits tend to trap rain water which has a tendency which in turn may enter the conduit through the opening through which the plant is growing, thus diluting the nutrient solution.

With circular conduits, the roots of the plant are constrained such that, essentially, the lateral growth of the roots equals the longitudinal growth, whereas, in nature, it is preferred that the lateral growth be greater than the longitudinal growth. This can be obviated by transplanting the plant to a conduit having a larger internal diameter at an appropriate time in the development of the plant. However the additional handling of the plant increases costs of production. A further disadvantage of a circular conduit is that it is too "deep" for certain plants such as lettuce and herbs which only have a shallow root ball and thus cannot be effectively coated with the nutrient solution.

The present invention aims to alleviate at least one of the abovementioned disadvantages and to provide a hydroponic apparatus which will be reliable and efficient in use. Other objects and advantages of this invention will hereinafter become apparent.

Throughout this specification, the term "substantially elliptical cross-section" is not limited to a cross-section which delineates a regular oval, but includes within its scope any related non-regular cross-section or similar but wherein the major axis remains of a greater length than the minor axis.

With the foregoing and other objects in view this invention relates to a hydroponic conduit said conduit comprising an elongated member of substantially elliptical cross-section.

Preferably, the elongated member includes a plurality of openings formed therein and wherein the spacing between adjacent openings may be determined by the type of plant to be grown. For example, the openings may be spaced at regular intervals longitudinally along one surface of the member and wherein each opening may be substantially co-axial with the minor axis of the member.

Because the elongated member may be initially provided to purchasers as a hollow elongated member without any openings formed therein, in one embodiment, an etched line may be provided along one surface of the member, such as a line co-axial with the minor axis of the member. The etch line may be used as a guide for the centre of openings to be cut into the member subsequently by the purchasers according to their individual requirements.

In use, the conduit would be used as a component of a hydroponic apparatus and in a method of hydroponic culture.

Therefore, according to a second aspect of the present invention, there is provided a hydroponic apparatus for use in hydroponic culture, said apparatus including:

at least one conduit comprising an elongated member of substantially elliptical cross-section, said conduit being provided with inlet means for introducing a nutrient solution into said conduit, outlet means for allowing the nutrient solution to exit said conduit and at least one opening formed therein through which a plant may extend.

In one embodiment there may be provided inlet means associated with each end of the conduit and outlet means associated with an intermediate portion of the conduit. In yet another embodiment the inlet means may be associated with a portion of the conduit intermediate the opposing ends of the conduit and wherein each end may include outlet means. However, preferably the inlet means is associated with one end of the conduit and the outlet means is associated with the opposing end of the conduit.

The conduit is preferably of the type described above.

Furthermore, it will be appreciated that the apparatus may include a multiplicity of conduits positioned such that the major axes are substantially horizontal and in a side-by-side relationship. The conduits may be supported by a supporting structure such as a table.

The outlet means may include drainage means, such as a sump, which may be adapted to collect solid or semi-solid detritus and separate same from the exiting nutrient solution before the thus-depleted solution is returned to the inlet means of the conduit.

In yet another aspect of this invention, there is provided a method of hydroponic culture, said method including:

providing a hydroponic conduit comprising an elongated member of substantially elliptical cross-section, said conduit being provided with inlet means for introducing a nutrient solution into said conduit, outlet means for allowing the nutrient solution to exit said conduit and at least one opening formed therein through which a plant may extend;

supporting a seedling within said opening such that at least some of the roots of the seedling are retained within the conduit, and using the inlet means to introduce a sufficient quantity of a nutrient solution into said conduit to make contact with the roots of the seedling.

In order that this invention may be more easily understood and put into practical effect, reference will now be made to the accompanying drawings which illustrate a preferred embodiment of the invention, wherein.

Figure 1:
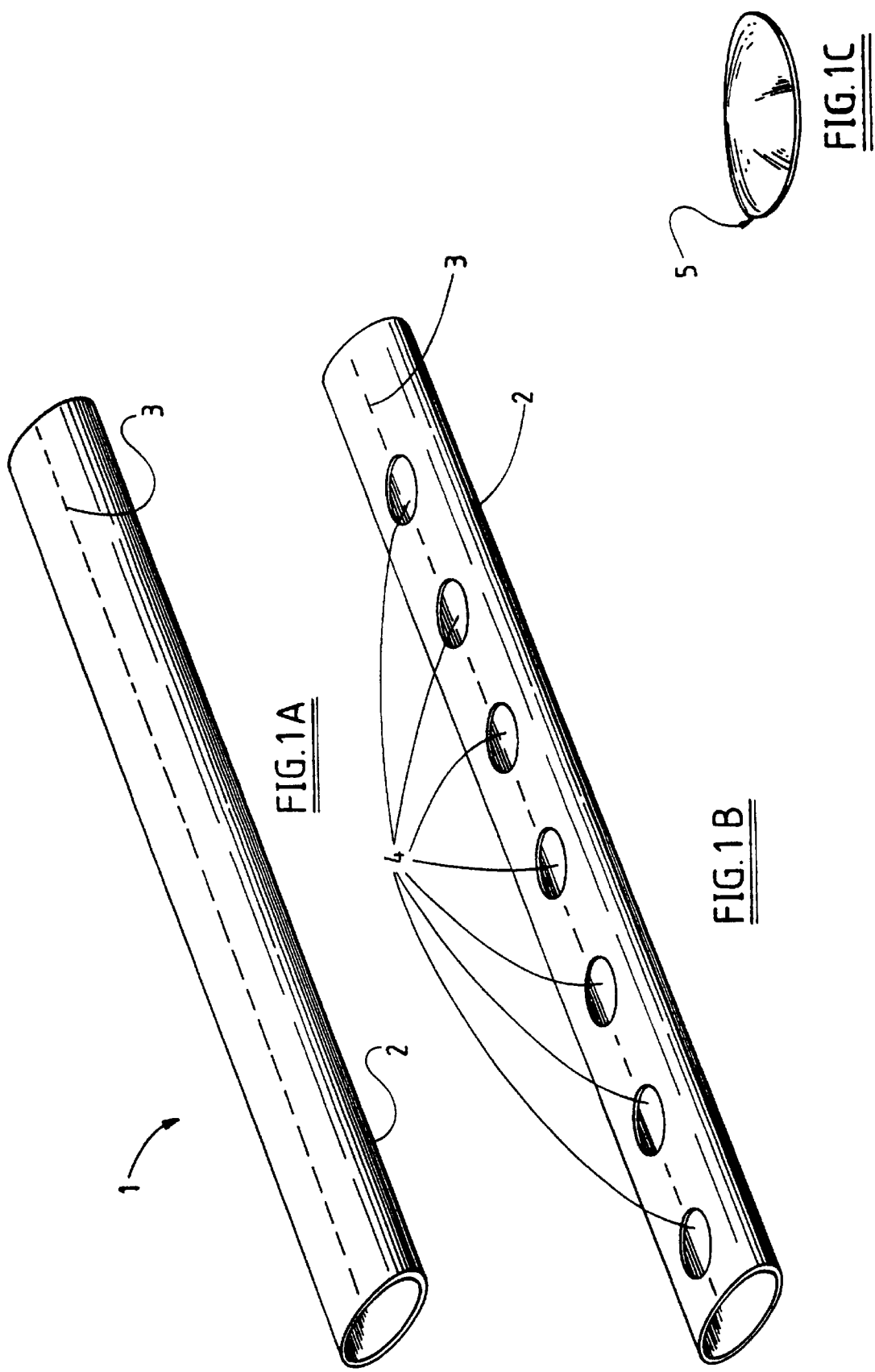
FIG. 1A is a preform of a conduit to be constructed in accordance with the present invention.
FIG. 1B is the preform of FIG. 1A further modified to a conduit constructed in accordance with the present invention.
FIG. 1C is the material removed from the openings in the conduit of FIG. 1B.

With reference to FIG. 1A, the preform (1) is an elongated hollow tube (2) of substantially elliptical cross-section. An etch line (3) is scored along one surface thereof co-axial with the minor axis of the tube (2). The etch line (3) identifies the centre of circular openings (4) spaced equidistant along the surface of the tube (2) (FIG. 1B). The resultant cutouts (5) (FIG. 1C) are retained for future use in the construction of the apparatus depicted in FIG. 2.

Figure 2:
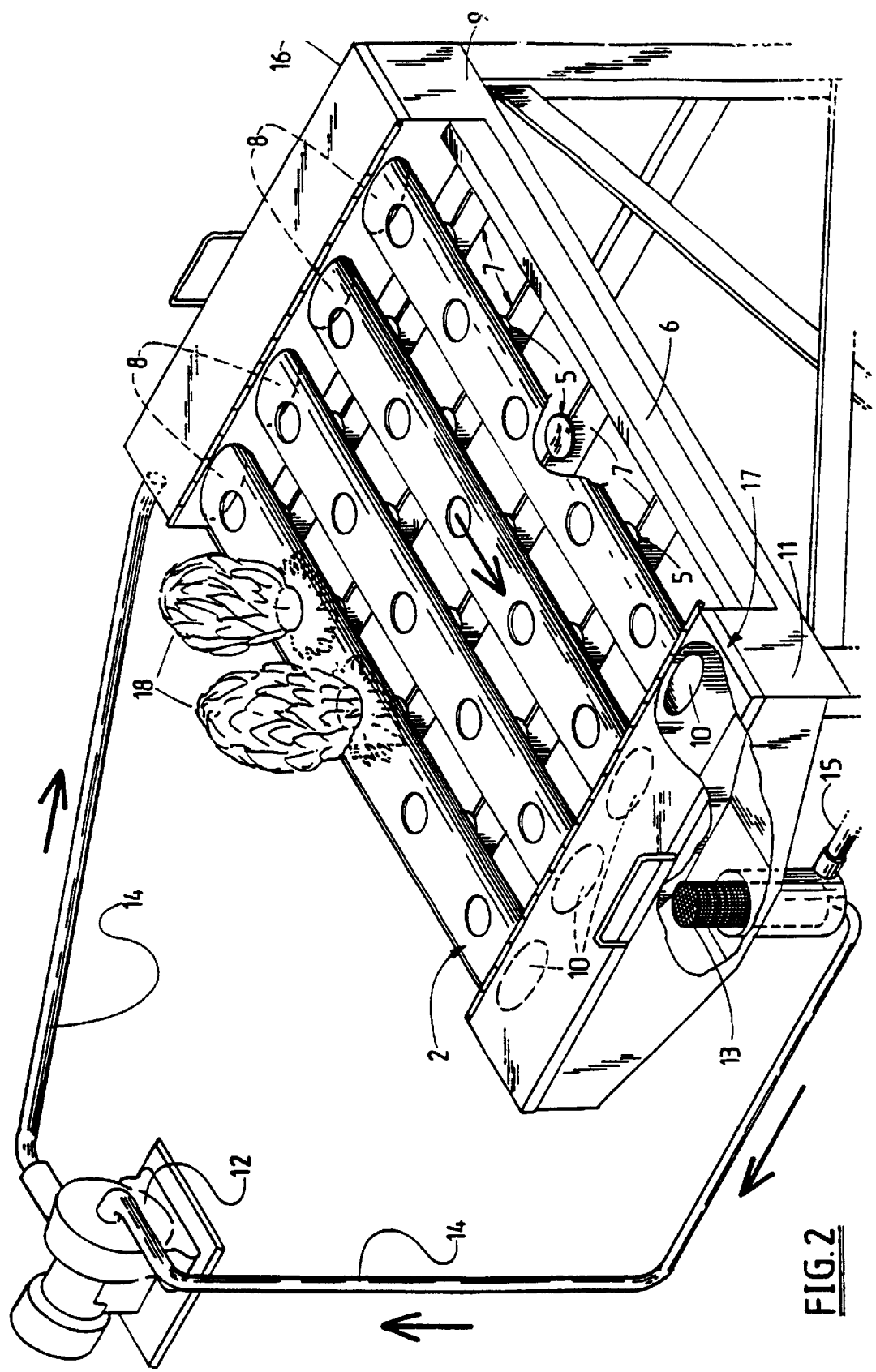
FIG. 2 is a hydroponic apparatus incorporating a multiplicity of the conduit of FIG. 1B.

The apparatus of FIG. 2 comprises a perimeter frame (6), the lateral sides of which are connected by spaced cross-members (7). The cutouts (5) are fixed to the cross-members (7) to support the tubes (2)—for example, they can be glued or rivetted into place, or affixed by any other suitable means known. The tubes (2) are then glued to the cutouts (5). The inlet end (8) of each tube (2) protrudes into a nutrient storage container (9) affixed to one end of the frame (6) by any suitable means. The outlet end (10) of each tube (2) protrudes into a sump (11) affixed to the opposite end of the frame (6) by any suitable means. A pump (12) pumps nutrient solution from the storage container (9) through the tube (2) to the sump (11) whereat the thus-pumped solution passes through any suitable filter (13) and is returned to the storage container (9) via piping (14) and the pump (12). As illustrated, a suitable filter could be a hollow net-like tube with small holes which allow the nutrient solution to pass through but not solids or semi-solids. The detritus that remains in the sump (11) can be removed through any suitable drain (15). Each of the storage container (9) and sump (11) has a hinged lid (16) and (17) respectively which allows easy access to the contents thereof.

In use, seedlings (18) (only partly illustrated in FIG. 2) are restrained in the openings (4) by any convenient means and nutrient solution is pumped through the apparatus. The elliptical cross-section of the tube (2) ensures that the majority of the nutrient solution flows through the tube (2) at its lowest point thus ensuring maximum and continual contact of the solution with the root ball of the plants.

By using the present invention, it has been found that the plant growth is enhanced over prior art arrangements. Although not wishing to be bound by theory, it is believed that this is due to, not only to the increased contact with the nutrient solution, but also to the better lateral growth of the root ball which imparts a "tumbling" action to the nutrient solution as it passes through leading to beneficial aeration of the nutrient solution. The growth rate of plants grown under these conditions is quicker, and the resultant plants appear healthier, over those grown by other hydroponic techniques. The elliptical surface of the conduit near the plant holes provides a better run-off for rain, thus reducing the entry of rain water into the conduit through the holes which would increase the dilution of the nutrient solution.

It will be appreciated that the above example is given as an illustration only of the present invention and that all such modifications and variations thereto as would be apparent to persons skilled in the art are deemed to fall within the broad scope and ambit of this invention as is herein defined in the appended claims.

The claims defining the invention are as follows:

1. A hydroponic apparatus for use in hydroponic culture, said apparatus including:

at least one conduit comprising a rigid or semi-rigid elongate member of substantially elliptical cross-section, said conduit being provided with an inlet for introducing a nutrient solution into said conduit, an outlet for allowing nutrient solution to exit said conduit and at least one opening formed in said conduit through which a plant may extend;

a pump in fluid communication with the inlet and the outlet, to pump nutrient solution from the outlet to the inlet;

wherein the opening is formed by a frangible segment removed from said member which segment is used to support said member, said segment being attached to a supporting structure.

2. A hydroponic apparatus for use in hydroponic culture, said apparatus including:

at least one conduit comprising a rigid or semi-rigid elongate member of substantially elliptical cross-section, said conduit being provided with an inlet for introducing a nutrient solution into said conduit, an outlet for allowing nutrient solution to exit said conduit and at least one opening formed in said conduit through which a plant may extend;

a pump in fluid communication with the inlet and the outlet, to pump nutrient solution from the outlet to the inlet;

wherein said inlet is associated with one end of said conduit and said outlet is associated with the opposing end of said conduit; and wherein the opening is formed by a frangible segment removed from said member which segment is used to support said member, said segment being attached to a supporting structure.

3. A hydroponic apparatus for use in hydroponic culture, said apparatus including:

at least one conduit comprising a rigid or semi-rigid elongate member of substantially elliptical cross-section, said conduit being provided with an inlet for introducing a nutrient solution into said conduit, an outlet for allowing nutrient solution to exit said conduit and at least one opening formed in said conduit through which a plant may extend;

a pump in fluid communication with the inlet and the outlet, to pump nutrient solution from the outlet to the inlet;

wherein said apparatus includes a drain in fluid communication with said outlet; and wherein the opening is formed by a frangible segment removed from said member which segment is used to support said member, said segment being attached to a supporting structure.

4. A hydroponic apparatus for use in hydroponic culture, said apparatus including:

at least one conduit comprising a rigid or semi-rigid elongate member of substantially elliptical cross section, said conduit defining an inlet for introducing a nutrient solution into said conduit, an outlet for allowing nutrient solution to exit said conduit and at least one opening formed in said conduit through which a plant may extend; and wherein openings are formed in said at least one conduit by a plurality of frangible segments removed from said conduit, the segments further utilized to support the conduit.

* * * * *